(12) United States Patent
Bickham et al.

(10) Patent No.: US 6,801,699 B1
(45) Date of Patent: Oct. 5, 2004

(54) HIGH CAPACITY OPTICAL WAVEGUIDE FIBER

(75) Inventors: Scott R. Bickham, Corning, NY (US); Phong Diep, Horseheads, NY (US); Pamela A. Hajcak, Corning, NY (US)

(73) Assignee: Corning Incorporated, Corning, NY (US)

( * ) Notice: Subject to any disclaimer, the term of this patent is extended or adjusted under 35 U.S.C. 154(b) by 194 days.

(21) Appl. No.: 10/280,534

(22) Filed: Oct. 25, 2002

Related U.S. Application Data (60) Provisional application No. 60/332,391, filed on Nov. 15, 2001.

(51) Int. Cl.$^7$ .............................. G02B 6/02; G02B 6/16
(52) U.S. Cl. ........................ 385/123; 385/124; 385/126
(58) Field of Search .............................. 385/123, 124, 385/126–128

(56) References Cited

U.S. PATENT DOCUMENTS

| | | | |
|---|---|---|---|
| 5,278,931 A | 1/1994 | Antos et al. | 385/126 |
| 5,684,909 A | 11/1997 | Liu | 385/127 |
| 5,715,346 A | 2/1998 | Liu | 385/124 |
| 5,781,684 A | 7/1998 | Liu | 385/124 |
| 6,317,551 B1 | 11/2001 | Mitchell et al. | 385/124 |
| 6,337,942 B1 | 1/2002 | Kato et al. | 385/127 |
| 6,424,777 B2 | 7/2002 | Ma et al. | 385/123 |
| 6,424,778 B1 * | 7/2002 | Li | 385/127 |
| 2001/0017967 A1 | 8/2001 | Hirano et al. | 385/123 |
| 2001/0021298 A1 | 9/2001 | Mukasa | 385/124 |

FOREIGN PATENT DOCUMENTS

| | | | |
|---|---|---|---|
| EP | 1030200 | 8/2000 | G02B/6/22 |
| EP | 1030474 | 8/2000 | H04B/10/18 |
| EP | 1107027 | 6/2001 | G02B/6/16 |
| EP | 1130426 | 9/2001 | G02B/6/16 |
| EP | 1160595 | 12/2001 | G02B/6/16 |
| JP | 08-160241 | 12/1994 | G02B/6/22 |
| WO | WO 00 77549 | 12/2000 | G02B/6/22 |
| WO | WO01/27667 | 4/2001 | G02B/6/00 |

OTHER PUBLICATIONS

Unger, C. et al., "Characterization of the Bending Sensitivity of Fibers by the Mac–Value", Optics Communications, North–Holland Publishing Co., Amsterdam, NL, vol. 107, No. 5/6, May 1, 1994, pp. 361–364.

Y. Liu et al, "Design and Fabrication of Locally Dispersion–Flattened Large Effective Area Fibers", ECOC'98, Sep. 20–24, 1998, Madrid, Spain, pp. 37–38.

M. Kato et al, "A new design for dispersion–shifted fiber with an effective core area larger than 100 $\mu m^2$ and good bending characteristics", OFC '98 Technical Digest, pp. 301–302.

D.W. Peckham et al, "Reduced Dispersion Slope, Non–Zero Dispersion Fiber", ECOC'98, Sep. 20–24, 1998, Madrid, Spain, pp. 139–140.

* cited by examiner

*Primary Examiner*—Mark Tremblay
*Assistant Examiner*—Lisa M. Caputo
(74) *Attorney, Agent, or Firm*—Joseph M. Homa

(57) ABSTRACT

An optical waveguide fiber that simultaneously exhibits large effective area and good resistance to bend induced attenuation, as measured by any of the tests known in the art. The cut off wavelength is controlled to allow single mode operation over a wavelength range that extends from about 1340 nm to 1650 nm. The optical waveguide fiber refractive index profile is simple in design allowing cost effective manufacture.

20 Claims, 4 Drawing Sheets

HIGH CAPACITY OPTICAL WAVEGUIDE FIBER

CROSS-REFERENCE TO RELATED APPLICATIONS

This application claims the benefit of priority under 35 U.S.C. §119(e) of U.S. Provisional Application Ser. No. 60/332,391 filed on Nov. 15, 2001.

BACKGROUND OF THE INVENTION

1. Field of the Invention

An optical waveguide fiber is disclosed herein for high capacity telecommunications systems and particularly an optical waveguide fiber combining large effective area and resistance to bend induced attenuation.

2. Technical Background

Optical waveguide fibers designed for transmission of greater information capacity over long distances, preferably without use of electronic regenerators, typically reduce certain types of non-linear interactions of the signal by providing high effective area. In addition, the signal degrading effect commonly called four wave or four photon mixing, an effect that occurs in communications systems using wavelength division signal multiplexing, can be counteracted by control of the optical waveguide fiber total dispersion over the operating wavelength range. That is, the total dispersion is made to be non-zero over the operating wavelength range, thus altering the phase relationship among the signals in such a way that they do not interfere.

Through use of dispersion compensation strategies, a high capacity optical waveguide fiber can have a greater total dispersion magnitude over the operating window of a communication system. Thus, the design limitations are loosened somewhat, allowing a refractive index profile researcher to relax total dispersion requirements while improving other key fiber properties such as attenuation and resistance to bend induced attenuation.

An additional important factor in refractive index profile design of high capacity optical waveguide fibers is the simplicity of the profile as simplicity of design relates to manufacturing cost. For example, a core region that provides the desired properties but has fewer significant changes in refractive index along a radius will in general be easier to manufacture.

The present invention addresses the need for high capacity optical waveguide fiber designs which have a simpler refractive index profile structure and provide high effective area while maintaining low attenuation and providing excellent resistance to bend induced attenuation.

DEFINITIONS

The following definitions are in accord with common usage in the art.

The refractive index profile is the relationship between refractive index or relative refractive index (percent) and waveguide fiber radius.

A segmented core is one that is divided into at least a first and a second waveguide fiber core portion or segment. Each portion or segment is located along a particular radial length, is substantially symmetric about the waveguide fiber centerline, and has an associated refractive index profile.

The radii of the segments of the core are defined in terms of the respective refractive indexes at respective beginning and end points of the segments. The definitions of the radii used herein are set forth in the figures and the discussion thereof.

Total dispersion, sometimes called chromatic dispersion, of a waveguide fiber is the sum of the material dispersion, the waveguide dispersion, and the inter-modal dispersion. In the case of single mode waveguide fibers the inter-modal dispersion is zero.

The sign convention generally applied to the total dispersion is as follows. Total dispersion is said to be positive if shorter wavelength signals travel faster than longer wavelength signals in the waveguide. Conversely, in a negative total dispersion waveguide, signals of longer wavelength travel faster.

The effective area is $A_{eff}=2\pi(\int E^2 \, r \, dr)^2/(\int E^4 \, r \, dr)$, where the integration limits are 0 to $\infty$, and E is the electric field associated with light propagated in the waveguide.

The relative refractive index percent, $\Delta\%=100\times(n_i^2-n_c^2)/2n_i^2$, where $n_i$ is the maximum refractive index in region i, unless otherwise specified, and $n_c$ is the average refractive index of the cladding region. In those cases in which the refractive index of a segment is less than the average refractive index of the cladding region, the relative index percent is negative and is calculated at the point at which the relative index in most negative unless otherwise specified. A positive relative index percent occurs where the refractive index is greater than the average refractive index of the cladding.

The term $\alpha$-profile refers to a refractive index profile, expressed in terms of $\Delta(b)$ %, where b is radius, which follows the equation, $\Delta(b)\% = \Delta(b_o)(1-[|b-b_0|/(b_1-b_o)]^\alpha)$, where $b_o$ is the point at which $\Delta(b)$ % is maximum, $b_1$ is the point at which $\Delta(b)$ % is zero, and b is in the range $b_i \leq b \leq b_f$, where delta is defined above, $b_i$ is the initial point of the $\alpha$-profile, $b_f$ is the final point of the $\alpha$-profile, and $\alpha$ is an exponent which is a real number.

The bend resistance of a waveguide fiber is expressed as induced attenuation under prescribed test conditions. Bend induced attenuation is also called bend loss herein. A bend test referenced herein is the pin array bend test that is used to compare relative resistance of waveguide fiber to bending. To perform this test, attenuation loss is measured for a waveguide fiber with essentially no induced bending loss. The waveguide fiber is then woven in a serpentine path through the pin array and attenuation again measured. The loss induced by bending is the difference between these two measured attenuation values expressed in dB. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the serpentine woven waveguide fiber conform to the portions of the pin surface at which there is contact between fiber and pin.

Another bend test referenced herein is the lateral load wire mesh test. In this test a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation is measured and expressed in dB/m. This increase in attenuation is the lateral load attenuation (or lateral load bend loss) of the waveguide.

A further test of the bend resistance of a waveguide fiber is one in which the fiber is wrapped a specified number of turns about a mandrel of a specified diameter. In each test condition the bend induced attenuation is expressed in units of dB/m, the length being determined by the number of turns of fiber and the mandrel diameter. The mandrel wrap test referenced herein is one in which induced attenuation is measured for 1 turn of waveguide fiber around a 20 mm diameter mandrel.

SUMMARY OF THE INVENTION

In one aspect, an optical waveguide fiber is disclosed herein which includes a central core region surrounded by and in contact with a clad layer. The central core region has a refractive index profile, a radius, and a centerline. The central core region has a portion with a refractive index profile configured to provide a local minimum relative refractive index percent on or near the centerline which is a fraction of the maximum relative refractive index percent of the central core region. In particular, the fraction formed by the ratio of the local minimum relative refractive index percent on or near centerline to the maximum value of relative refractive index percent in the central core region is in the range from 0.65 to 1.0. This fraction, together with the value of central core radius and maximum relative refractive index percent are chosen to provide an optical waveguide fiber having an effective area not less than 115 $\mu m^2$ at 1550 nm, a 20 mm mandrel wrap bend loss at 1550 nm not greater than 25 dB/m, and a lateral load wire mesh bend loss at 1550 nm not greater than 1.5 dB/m, preferably not greater than 0.5 dB/m. Advantageously, the pin array bend loss at 1550 nm is not greater than 1 dB/m. The 20 mm mandrel wrap bend loss is preferably not greater than 20 dB/m, and more preferably not greater than 10 dB/m.

The fraction preferably lies in the range from 0.75 to 0.85.

In an embodiment of the optical waveguide fiber disclosed herein, the refractive index profile parameters are selected to further provide an attenuation at 1550 nm less than or equal to 0.22 dB/km, zero dispersion wavelength no greater than 1400 nm, polarization mode dispersion not greater than 0.06 ps/km$^{1/2}$, and cabled cut off wavelength no greater than 1500 nm. The attenuation at 1550 nm is preferably less than 0.20 dB/km, more preferably less than 0.19 dB/km.

In a further embodiment of the optical waveguide fiber disclosed herein, the maximum relative refractive index percent of the central core region is reached at a radius not less than 0.25 of the central core radius. The central core radius of this embodiment has a range from 6 $\mu m$ to 9 $\mu m$ and preferably a range from 6.5 $\mu m$ to 7.5 $\mu m$.

In this first aspect, the maximum value of relative refractive index percent has a range from 0.25% to 0.45% and preferably a range from 0.28% to 0.35%.

In another embodiment of this first aspect, the optical waveguide fiber disclosed herein has a central core region that exhibits a relative refractive index percent that rises monotonically from its centerline value to its maximum value. The local minimum relative refractive index percent on or near the centerline in the central core region in this embodiment has a range from 0.2% to 0.3%.

In a second aspect, the optical waveguide fiber disclosed herein includes a central core region and an annular region of negative relative refractive index percent located between the central core region and the surrounding clad layer. Preferably, tne clad layer is adjacent to the annular region, and the annular region is adjacent to the central core region. The negative relative refractive index percent of the annular region can be achieved by adding an index reducing dopant to the annular region or by adding an index increasing dopant to the clad layer. These alternatives are in accord with the definition of negative relative refractive index percent stated above. Preferably, the central core region has a radius in the range from 7 $\mu m$ to 9.5 $\mu m$. Also, preferably the annular negative relative refractive index percent region has inner radius equal to the central core radius, an outside radius in the range from 14 $\mu m$ to 18 $\mu m$, and a minimum relative refractive index percent in the range from −0.05% to −0.15%.

The effective area is not less than 120 $\mu m$, preferably is not less than 130 $\mu m$, more preferably not less than 140 $\mu m^2$, and most preferably not less than 150 $\mu m^2$. In addition, the bend resistance is such that one turn of the fiber about a 20 mm diameter mandrel induces an attenuation at 1550 nm of less than 25 dB/m, and preferably less than 20 dB/m, and more preferably less than 10 dB/m.

In each of the embodiments set forth above, the OH$^-$ content of the optical waveguide fiber is preferably controlled to a value sufficiently low to enable operation of the waveguide in a wavelength region including the range 1380 nm to 1390 nm.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 1:
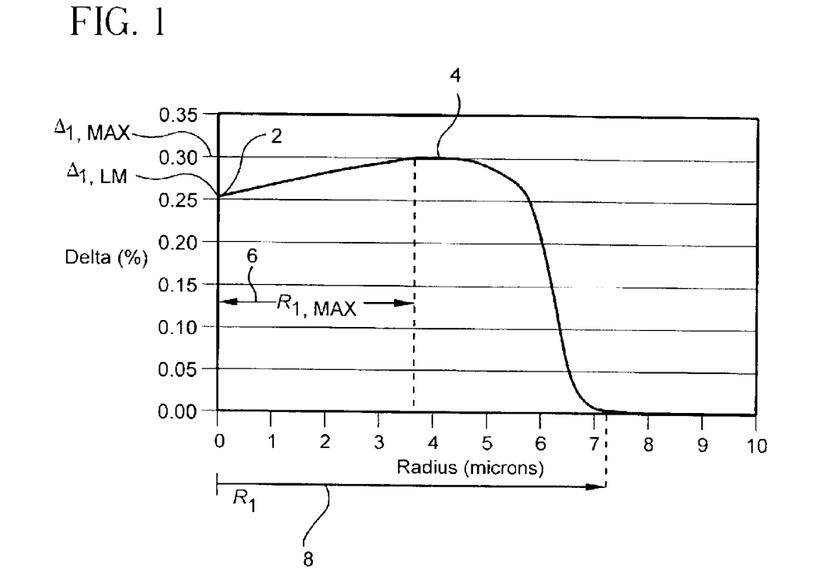
FIG. 1 is a refractive index profile plotted in relative refractive index percent versus radius for an optical waveguide fiber as disclosed herein.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the optical waveguide fiber disclosed herein is shown in FIG. 1, represented by a graph of relative refractive index percent versus radius of the optical waveguide fiber. The central core region of the optical fiber has a portion with a relative refractive index percent that has a lower value or local minimum 2 on or near the centerline and then increases until reaching the maximum value of relative refractive index percent 4 of the central core region at radius 6. The relative refractive index percent preferably remains at its maximum value for another portion of the central core region until the relative refractive index percent decreases in magnitude until reaching the clad layer at radius 8.

Although the increase in relative refractive index percent from its value at or near the centerline to that at radius 6 is shown as a monotonic increase in FIG. 1, it will be understood that the increasing profile portion can take on a variety of shapes while retaining properties in accord with the optical waveguide fiber disclosed herein. For example, the profile shape between relative refractive index percent points 2 and 4 can be a step, a series of steps, or smooth curves having different degrees of concavity or convexity.

The relative refractive index percent profile in accord with the optical waveguide fiber disclosed herein provides a large effective area together with an excellent resistance to bend induced attenuation. The bend resistance is characterized by the bend tests set forth above, although other bend tests, for example those using different screen mesh size in the lateral load test, can be used. These features are enhanced when combined in an optical waveguide fiber that further is characterized by a low water peak over the range of wavelengths 1380 nm to 1386 nm.

Over this range of wavelengths, the water peak in the attenuation curve of an optical waveguide fiber can be reduced to a value not greater than about 0.5 dB/km, preferably not greater than about 0.4 dB/km, and most preferably not greater than about 0.35 dB/km.

Methods of producing low water peak optical fiber can be found in U.S. application Ser. No. 09/722,804 filed Nov. 27, 2001, U.S. application Ser. No. 09/547,598 filed Apr. 11, 2000, U.S. Provisional Application Serial No. 60/258,179 filed Dec. 22, 2000, and U.S. Provisional Application Serial No. 60/275,015 filed Feb. 28, 2001, the contents of each being hereby incorporated by reference. Generally, the method set forth in the incorporated documents includes the steps of drying the soot preform using a gas such as chlorine and then maintaining the soot in its dry state by isolating the essentially OH$^-$ free (dry) soot from contact with any source of OH$^-$ ions, hydrogen or hydrogen containing compound. The soot can be deposited using any of the several methods known in the art, for example, outside vapor deposition, modified vapor deposition, or vertical vapor deposition. A preferred method of isolating the dried soot from sources of OH$^-$ ions, hydrogen or hydrogen containing compounds is through use of deuterated glass articles as containing means for the dried soot. In those soot deposition processes that result in a soot preform having a centerline hole, deuterated glass plugs can be used to seal the centerline, thereby preventing re-wetting of the dried soot.

An example of a method of deuterating a glass body that will be proximate the dried soot, acting for example as a seal or the walls of a chamber, the glass body is exposed to 5% deuterium in a helium atmosphere at 1 atm at about 1000° C. for about 24 hours. As an alternative the glass body can be exposed to 3% deuterium in a nitrogen atmosphere at 1 atm at about 1000° C. for about 24 hours.

Advantageous features of the optical waveguide fiber disclosed herein are illustrated by the following examples and comparative examples. In the exemplified embodiments below, the modeled parametric values of the optical waveguide fiber have been verified through measurement of fibers manufactured in accord with the embodiment.

EXAMPLE 1

Referring to FIG. 1, the central core region has a portion with a local minimum relative refractive index percent 2 on or near centerline equal to about 0.25%, and the central core region maximum relative refractive index percent 4 is about 0.30% and is located at a radius 6 of about 3.64 μm, and the core radius 8 is about 7.1 μm. Table 1 gives the modeled optical properties of the optical waveguide fiber having a core region in accord with FIG. 1.

TABLE 1

| | |
|---|---|
| Total Dispersion at 1550 nm (ps/nm-km) | 20.86 |
| Dispersion Slope at 1550 nm (ps/nm$^2$-km) | 0.06 |
| Attenuation at 1550 nm (dB/km) | 0.188 |
| Effective Area (μm$^2$) | 126.0 |
| Lateral Load Bend Loss (dB/m) | 0.04 |
| Pin Array Bend Loss (dB) | 0.05 |
| $\Delta_{1, LM}$ (%) | 0.25 |
| $R_{1, LM}$ (μm) | 0 |
| $\Delta_{1, MAX}$ (%) | 0.30 |
| $\dfrac{\Delta_{1,LM}}{\Delta_{1,MAX}}$ | 0.83 |
| $R_{1, MAX}$ (μm) | 3.64 |
| $R_1$ (μm) | 7.1 |
| $\dfrac{R_{1,MAX}}{R_1}$ | 0.51 |
| $\dfrac{R_{1,LM}}{R_1}$ | 0 |
| $R_{1, MAX} - R_{1, LM}$ (μm) | 3.64 |
| $\dfrac{\Delta_{1,MAX} - \Delta_{1,LM}}{R_{1,MAX} - R_{1,LM}}$ (%-μm$^{-1}$) | 0.0137 |

Two fibers were manufactured having a core region in accord with FIG. 1. The measured results are given in Table 2.

TABLE 2

| | Fiber 1 | Fiber 2 |
|---|---|---|
| Total Dispersion at 1550 nm (ps/nm-km) | 19.9 | 20.1 |
| Dispersion Slope at 1550 nm (ps/nm$^2$-km) | 0.061 | 0.060 |
| Effective Area (μm$^2$) | 119 | 125 |
| 20 mm Mandrel (dB/m) | 17 | 6 |
| Pin Array Bend Loss (dB) | 0.4 | 5.2 |
| Cabled Cutoff (nm) | 1341 | 1482 |

A comparison of Tables 1 and 2 shows good agreement between the respective modeled and measured results. Table 2 shows that the manufactured fiber has high effective area, low pin array bend induced loss, and low mandrel wrap bend induced loss. These properties allow for operation of a high performance telecommunication system.

The low cabled cut off value of the optical waveguide fiber manufactured in accord with the invention allows a high performance single mode telecommunication system to operate over an extended wavelength range, preferably a range spanning 1340 nm to 1650 nm.

Comparative Example 2

Figure 2:
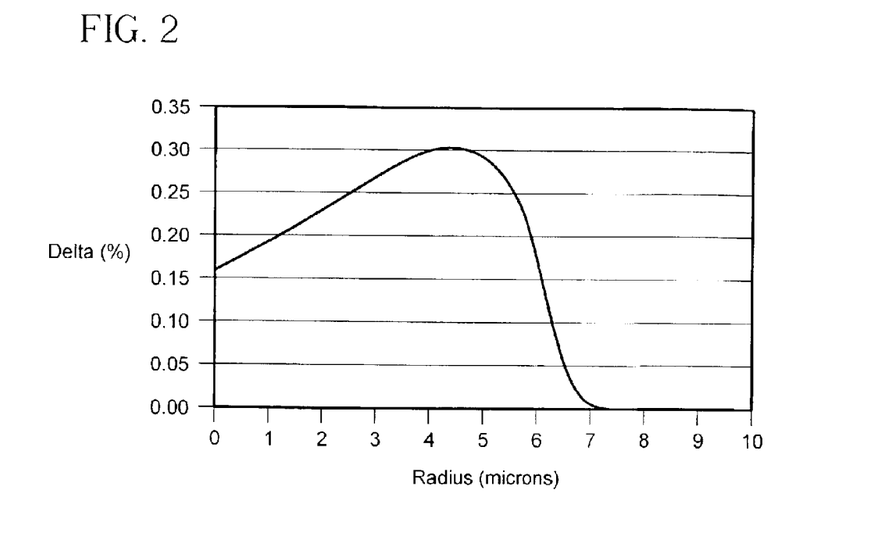
FIGS. 2 and 3 show graphs of relative refractive index percent versus radius of comparative examples.

An optical waveguide fiber having a relative refractive index percent core profile in accord with FIG. 2 was modeled to predict optical properties. This profile exhibits a deeper depression or lower local minimum on centerline with a relative refractive index percent of about 0.15%, and the radius at which the maximum relative refractive index percent is reached at about 4 μm, which occurs further radially outward compared to Example 1. The modeled properties are given in Table 3.

TABLE 3

| | |
|---|---|
| Total Dispersion at 1550 nm (ps/nm-km) | 20.73 |
| Dispersion Slope at 1550 nm (ps/nm²-km) | 0.06 |
| Attenuation at 1550 nm (dB/km) | 0.190 |
| Effective Area (μm²) | 143.75 |
| Lateral Load Bend Loss (dB/m) | 8.95 |
| Pin Array Bend Loss (dB) | 8.89 |
| $\Delta_{1, LM}$ (%) | 0.15 |
| $R_{1, LM}$ (μm) | 0 |
| $\Delta_{1, MAX}$ (%) | 0.3 |
| $\dfrac{\Delta_{1,LM}}{\Delta_{1,MAX}}$ | 0.5 |
| $R_{1, MAX}$ (μm) | 4 |
| $R_1$ (μm) | 7.1 |
| $\dfrac{R_{1,MAX}}{R_1}$ | 0.56 |
| $\dfrac{R_{1,LM}}{R_1}$ | 0 |
| $R_{1, MAX} - R_{1, LM}$ (μm) | 4 |
| $\dfrac{\Delta_{1,MAX} - \Delta_{1,LM}}{R_{1,MAX} - R_{1,LM}}$ (%-μm$^{-1}$) | 0.0375 |

A comparison of Tables 1 and 3 show that although effective area is larger for the central core region in accord with FIG. 2, the bend induced attenuation has increased dramatically. The performance of the optical waveguide fiber of example 1 can be expected to exhibit superior performance in a telecommunication system in comparison to the optical waveguide fiber of comparative example 2.

Comparative Example 3

Figure 3:
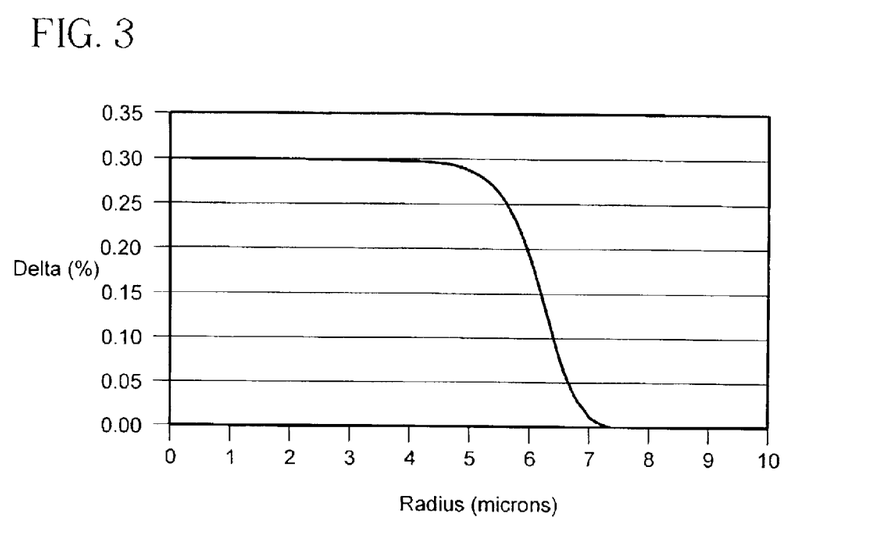

An optical waveguide fiber having a relative refractive index percent core profile in accord with FIG. 3 was modeled to predict optical properties. This profile exhibits no depression on or near centerline and is essentially a step index core having an outside radius of about 7.1 μm, equal to that of the profile of FIG. 1 in accord with the disclosure herein. The modeled properties are given in Table 4.

TABLE 4

| | |
|---|---|
| Total Dispersion at 1550 nm (ps/nm-km) | 20.78 |
| Dispersion Slope at 1550 nm (ps/nm²-km) | 0.06 |
| Attenuation at 1550 nm (dB/km) | 0.187 |
| Effective Area (μm²) | 120.57 |
| Lateral Load Bend Loss (dB/m) | 2.26 |
| Pin Array Bend Loss (dB) | 1.15 |
| $\Delta_1$, MAX (%) | 0.3 |
| $R_1$ (μm) | 7.1 |

A comparison of Tables 1 and 4 show that effective area is smaller for the central core region in accord with FIG. 3 and the bend induced attenuation is a factor of about 50 greater than that of the optical waveguide fiber made in accord with FIG. 1 as disclosed herein. The performance of the optical waveguide fiber of example 1 can be expected to exhibit superior performance in a telecommunication system in comparison to the optical waveguide fiber of comparative example 3.

EXAMPLE 4

Figure 4:
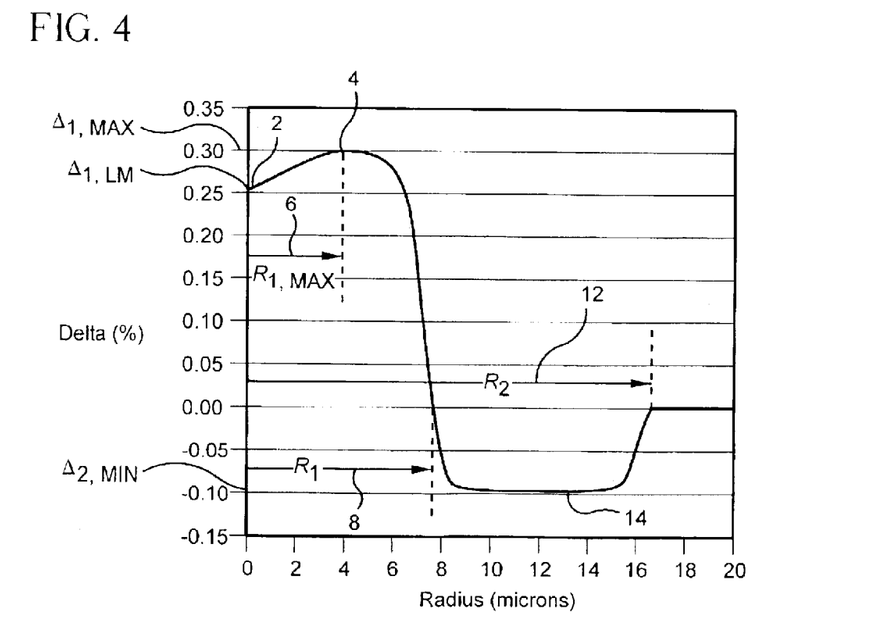
FIG. 4 is a refractive index profiled plotted in relative refractive index percent versus radius for another embodiment of an optical waveguide fiber as disclosed herein.

In a second aspect, certain properties of the optical waveguide fiber disclosed herein can be enhanced by including an annular region of lower refractive index surrounding the central core region in accordance with the optical waveguide fiber disclosed herein. Referring to the example in FIG. 4, the local minimum relative refractive index percent of the central core region on or near the centerline 2 is about 0.25%, and the maximum relative refractive index percent of the central core region is about 0.30% and is located at a radius 6 of about 4.0 μm. The central core radius 8 is about 7.7 μm. A negative relative refractive index percent annular region 14 extends from the end of the central core region to a radius 12 of about 16.6 μm. The shape of the negative relative refractive index percent annular region shown in FIG. 4 is a rounded step having a most negative relative refractive index percent of about 0.09% (i.e. a minimum relative refractive index percent of −0.09% for the annular region). It will be understood that the shape of the annular region of negative relative refractive index percent can take on shapes other than that of the illustrated rounded step while preserving the desired properties of the optical waveguide fiber disclosed herein. For example, the annular region can have a trapezoidal shape or can have an α-profile with α in the range from 0.1 to 20.

Table 5 gives the modeled functional properties of the optical waveguide fiber having a central core region and annular region in accord with FIG. 4.

TABLE 5

| | |
|---|---|
| Total Dispersion at 1550 nm (ps/nm-km) | 22.26 |
| Dispersion Slope at 1550 nm (ps/nm²-km) | 0.06 |
| Attenuation at 1550 nm (dB/km) | 0.188 |
| Effective Area (μm²) | 136.93 |
| Lateral Load Bend Loss (dB/m) | 0.24 |
| Pin Array Bend Loss (dB) | 0.21 |

The addition of the annular region of negative relative refractive index percent surrounding the central core region allows an increase in effective area by about 10% while maintaining excellent resistance to bend induced attenuation.

EXAMPLE 5

Figure 5:
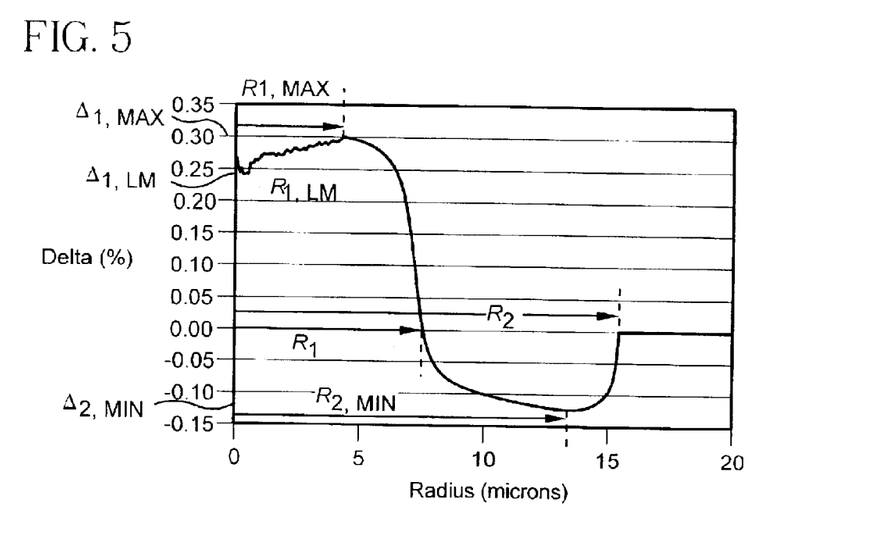
FIG. 5 is a refractive index profiled plotted in relative refractive index percent versus radius for yet another embodiment of an optical waveguide fiber as disclosed herein.

An optical fiber was manufactured having a central core region, an annular region, and cladding similar to that shown in FIG. 4. The measured refractive index profile of the manufactured fiber is shown by the plot of relative refractive index percent versus radius in FIG. 5. The local minimum relative refractive index percent of the central core region on or near the centerline 2 is about 0.245% at a radius of about 0.24 μm, and the maximum relative refractive index percent of the central core region is about 0.30% and is located at a radius 6 of about 5.0 μm. The central core radius 8, i.e. where the relative refractive index reaches 0%, is about 7.6 μm. A negative relative refractive index percent annular region 14 extends from the end of the central core region to a radius 12 of about 15.4 μm. The negative relative refractive index percent annular region shown in FIG. 5 has a minimum negative relative refractive index percent of about 0.12% (i.e. a minimum relative refractive index of about −0.12%) at a radius of about 13.4 μm. It will be understood that the shape of the annular region of negative relative refractive index percent can take on shapes other than that illustrated The measured results of the optical fiber of FIG. 5 are given in Table 6.

TABLE 6

| | |
|---|---|
| Total Dispersion at 1550 nm (ps/nm-km) | 20.50 |
| Dispersion Slope at 1550 nm (ps/nm²-km) | 0.061 |
| Effective Area (μm²) | 137.0 |
| 20 mm Mandrel (dB/m) | 6 |
| Pin Array Bend Loss (dB) | 5.8 |
| Cabled Cutoff (nm) | 1480 |
| $\Delta_{1,\,LM}$ (%) | 0.245 |
| $R_{1,\,LM}$ (μm) | 0.24 |
| $\Delta_{1,\,MAX}$ (%) | 0.30 |
| $\dfrac{\Delta_{1,LM}}{\Delta_{1,MAX}}$ | 0.82 |
| $R_{1,\,MAX}$ (μm) | 5.0 |
| $R_1$ (μm) | 7.6 |
| $\dfrac{R_{1,MAX}}{R_1}$ | 0.66 |
| $\dfrac{R_{1,LM}}{R_1}$ | 0.03 |
| $R_{1,\,MAX}\text{-}R_{1,\,LM}$ (μm) | 4.76 |
| $\Delta_{2,\,MIN}$ (%) | −0.12 |
| $R_{2,\,MIN}$ (μm) | 13.4 |
| $R_2$ (μm) | 15.4 |
| $\dfrac{R_2}{R_1}$ | 2.03 |
| $\dfrac{\Delta_{1,MAX} - \Delta_{1,LM}}{R_{1,MAX} - R_{1,LM}}$ (%-μm⁻¹) | 0.0116 |

EXAMPLE 6

Figure 6:
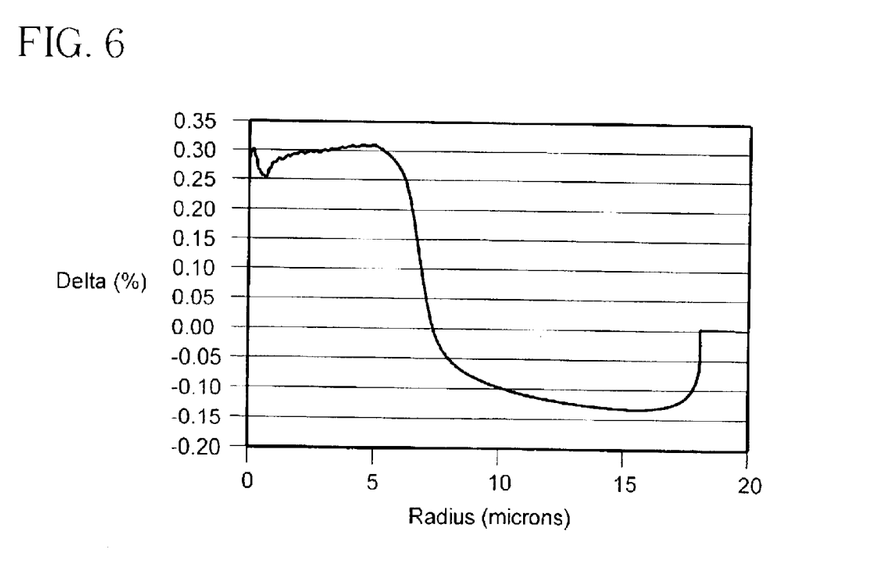
FIG. 6 is a refractive index profiled plotted in relative refractive index percent versus radius for still another embodiment of an optical waveguide fiber as disclosed herein.

An optical fiber was manufactured having a central core region, an annular region, and cladding. The measured refractive index profile of the manufactured fiber is shown by the plot of relative refractive index percent versus radius in FIG. 6. The local minimum relative refractive index percent of the central core region on or near the centerline 2 is about 0.256% at a radius of about 0.62 μm, and the maximum relative refractive index percent of the central core region is about 0.308% and is located at a radius 6 of about 5.2 μm. The central core radius 8, i.e. where the relative refractive index reaches 0%, is about 7.3 μm. A negative relative refractive index percent annular region 14 extends from the end of the central core region to a radius 12 of about 18.1 μm. The negative relative refractive index percent annular region shown in FIG. 6 has a minimum negative relative refractive index percent of about 0.136% (i.e. a minimum relative refractive index of about −0.136%) at a radius of about 15.5 μm. It will be understood that the shape of the annular region of negative relative refractive index percent can take on shapes other than that illustrated The measured results of the optical fiber of FIG. 6 are given in Table 7.

TABLE 7

| | |
|---|---|
| Total Dispersion at 1550 nm (ps/nm-km) | 21.3 |
| Dispersion Slope at 1550 nm (ps/nm²-km) | 0.065 |
| Effective Area (μm²) | 148.0 |
| Pin Array Bend Loss (dB) | 0.96 |
| Cabled Cutoff (nm) | 1340 |
| $\Delta_{1,\,LM}$ (%) | 0.256 |
| $R_{1,\,LM}$ (μm) | 0.62 |
| $\Delta_{1,\,MAX}$ (%) | 0.308 |
| $\dfrac{\Delta_{1,LM}}{\Delta_{1,MAX}}$ | 0.83 |
| $R_{1,\,MAX}$ (μm) | 5.2 |
| $R_1$ (μm) | 7.3 |
| $\dfrac{R_{1,MAX}}{R_1}$ | 0.71 |
| $\dfrac{R_{1,LM}}{R_1}$ | 0.08 |
| $R_{1,\,MAX}\text{-}R_{1,\,LM}$ (μm) | 4.58 |
| $\Delta_{2,\,MIN}$ (%) | −0.136 |
| $R_{2,\,MIN}$ (μm) | 15.5 |
| $R_2$ (μm) | 18.1 |
| $\dfrac{R_2}{R_1}$ | 2.4 |
| $\dfrac{\Delta_{1,MAX} - \Delta_{1,LM}}{R_{1,MAX} - R_{1,LM}}$ (%-μm⁻¹) | 0.0114 |
| Mode Field Diameter, MFD (μm) | 13.05 |
| Bend Loss 32 mm Mandrel, 1 turn, @ 1550 nm (dB/m) | 0.03 |
| Bend Loss 32 mm Mandrel, 1 turn, @ 1610 nm (dB/m) | 0.27 |
| Attenuation @ 1310 nm (dB/km) | 0.333 |
| Attenuation @ 1380 nm (dB/km) | 0.308 |
| Attenuation @ 1550 nm (dB/km) | 0.187 |
| Attenuation @ 1610 nm (dB/km) | 0.192 |
| Length (km) | 8.01 |

EXAMPLE 7

Figure 7:
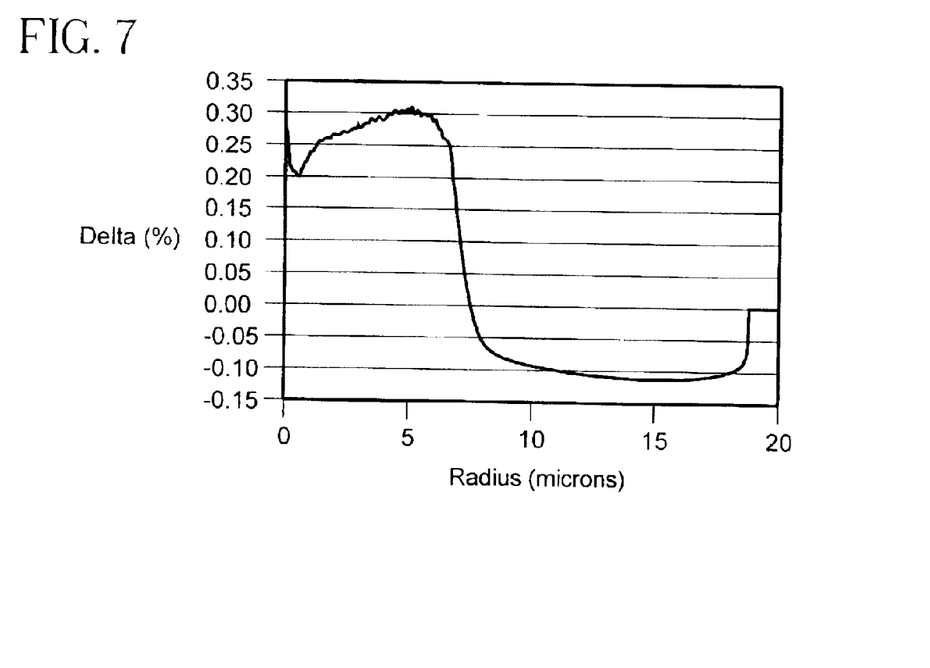
FIG. 7 is a refractive index profiled plotted in relative refractive index percent versus radius for another embodiment of an optical waveguide fiber as disclosed herein.

An optical fiber was manufactured having a central core region, an annular region, and cladding. The measured refractive index profile of the manufactured fiber is shown by the plot of relative refractive index percent versus radius in FIG. 7. The local minimum relative refractive index percent of the central core region on or near the centerline 2 is about 0.199% at a radius of about 0.57 μm, and the maximum relative refractive index percent of the central core region is about 0.318% and is located at a radius 6 of about 5.1 μm. The central core radius 8, i.e. where the relative refractive index reaches 0%, is about 7.4 μm. A negative relative refractive index percent annular region 14 extends from the end of the central core region to a radius 12 of about 18.8 μm. The negative relative refractive index percent annular region shown in FIG. 7 has a minimum negative relative refractive index percent of about 0.114% (i.e. a minimum relative refractive index of about −0.114%) at a radius of about 15.5 µm. It will be understood that the shape of the annular region of negative relative refractive index percent can take on shapes other than that illustrated The measured results of the optical fiber of FIG. 7 are given in Table 8.

TABLE 8

| | |
|---|---:|
| Total Dispersion at 1550 nm (ps/nm-km) | 21.3 |
| Dispersion Slope at 1550 nm (ps/nm$^2$-km) | 0.063 |
| Effective Area (µm$^2$) | 166.2 |
| Pin Array Bend Loss (dB) | 1.19 |
| Cabled Cutoff (nm) | 1400 |
| $\Delta_{1,\,LM}$ (%) | 0.199 |
| $R_{1,\,LM}$ (µm) | 0.57 |
| $\Delta_{1,\,MAX}$ (%) | 0.318 |
| $\dfrac{\Delta_{1,LM}}{\Delta_{1,MAX}}$ | 0.63 |
| $R_{1,\,MAX}$ (µm) | 5.1 |
| $R_1$ (µm) | 7.4 |
| $\dfrac{R_{1,MAX}}{R_1}$ | 0.69 |
| $\dfrac{R_{1,LM}}{R_1}$ | 0.03 |
| $R_{1,\,MAX}-R_{1,\,LM}$ (µm) | 4.53 |
| $\Delta_{2,\,MIN}$ (%) | −0.114 |
| $R_{2,\,MIN}$ (µm) | 15.5 |
| $R_2$ (µm) | 18.8 |
| $\dfrac{R_2}{R_1}$ | 2.54 |
| $\dfrac{\Delta_{1,MAX}-\Delta_{1,LM}}{R_{1,MAX}-R_{1,LM}}$ (%-µm$^{-1}$) | 0.0263 |
| Mode Field Diameter, MFD (µm) | 13.35 |
| 32 mm Mandrel, 1 turn, @ 1550 nm (dB/m) | 0.37 |
| 32 mm Mandrel, 1 turn, @ 1610 nm (dB/m) | 0.41 |
| Attenuation @ 1310 nm (dB/km) | 0.351 |
| Attenuation @ 1380 nm (dB/km) | 0.58 |
| Attenuation @ 1550 nm (dB/km) | 0.196 |
| Attenuation @ 1610 nm (dB/km) | 0.200 |
| Length (km) | 5.97 |

EXAMPLE 8

Figure 8:
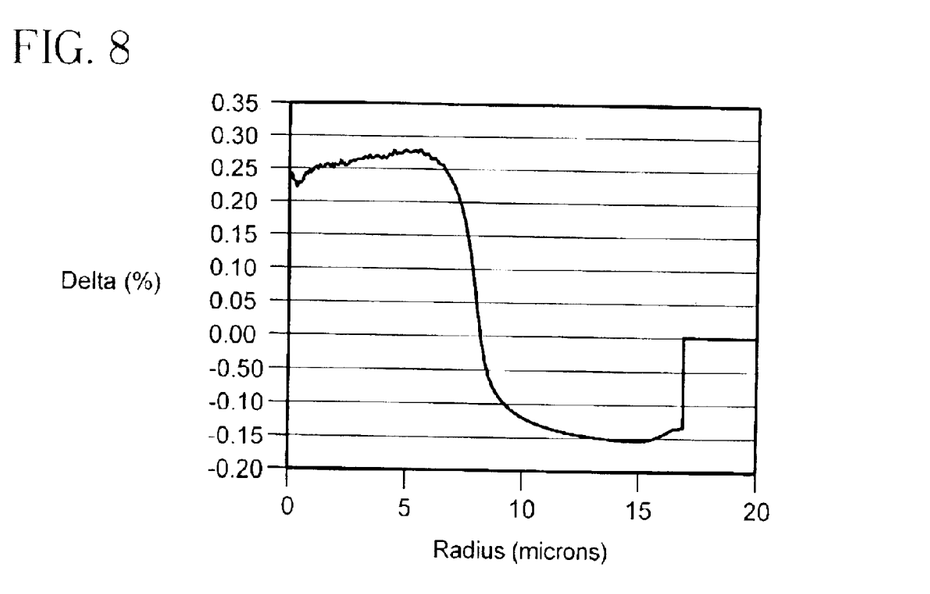
FIG. 8 is a refractive index profiled plotted in relative refractive index percent versus radius for yet another embodiment of an optical waveguide fiber as disclosed herein.

An optical fiber was manufactured having a central core region, an annular region, and cladding. The measured refractive index profile of the manufactured fiber is shown by the plot of relative refractive index percent versus radius in FIG. 8. The local minimum relative refractive index percent of the central core region on or near the centerline 2 is about 0.223% at a radius of about 0.41 µm, and the maximum relative refractive index percent of the central core region is about 0.282% and is located at a radius 6 of about 5.0 µm. The central core radius 8, i.e. where the relative refractive index reaches 0%, is about 8.2 µm. A negative relative refractive index percent annular region 14 extends from the end of the central core region to a radius 12 of about 17.0 µm. The negative relative refractive index percent annular region shown in FIG. 8 has a minimum negative relative refractive index percent of about 0.154% (i.e. a minimum relative refractive index of about −0.154%) at a radius of about 14.8 µm. It will be understood that the shape of the annular region of negative relative refractive index percent can take on shapes other than that illustrated The measured results of the optical fiber of FIG. 8 are given in Table 9.

TABLE 9

| | |
|---|---:|
| Total Dispersion at 1550 nm (ps/nm-km) | 21.4 |
| Dispersion Slope at 1550 nm (ps/nm$^2$-km) | 0.067 |
| Effective Area (µm$^2$) | 176.5 |
| Pin Array Bend Loss (dB) | 1.33 |
| Cabled Cutoff (nm) | 1480 |
| $\Delta_{1,\,LM}$ (%) | 0.223 |
| $R_{1,\,LM}$ (µm) | 0.41 |
| $\Delta_{1,\,MAX}$ (%) | 0.282 |
| $\dfrac{\Delta_{1,LM}}{\Delta_{1,MAX}}$ | 0.79 |
| $R_{1,\,MAX}$ (µm) | 5.0 |
| $R_1$ (µm) | 8.2 |
| $\dfrac{R_{1,MAX}}{R_1}$ | 0.61 |
| $\dfrac{R_{1,LM}}{R_1}$ | 0.08 |
| $R_{1,\,MAX}-R_{1,\,LM}$ (µm) | 4.59 |
| $\Delta_{2,\,MIN}$ (%) | −0.154 |
| $R_{2,\,MIN}$ (µm) | 14.8 |
| $R_2$ (µm) | 17.0 |
| $\dfrac{R_2}{R_1}$ | 2.07 |
| $\dfrac{\Delta_{1,MAX}-\Delta_{1,LM}}{R_{1,MAX}-R_{1,LM}}$ (%-µm$^{-1}$) | 0.0129 |
| Mode Field Diameter, MFD (µm) | 14.2 |
| 32 mm Mandrel, 1 turn, @ 1550 nm (dB/m) | 0.3 |
| 32 mm Mandrel, 1 turn, @ 1610 nm (dB/m) | 0.2 |
| Attenuation @ 1310 nm (dB/km) | 0.329 |
| Attenuation @ 1380 nm (dB/km) | 0.291 |
| Attenuation @ 1550 nm (dB/km) | 0.191 |
| Attenuation @ 1610 nm (dB/km) | 0.193 |
| Length (km) | 11.1 |

The agreement between the modeled and measured optical waveguide fiber parameters is good. The manufactured fiber has very high effective area and unusually good resistance to bend induced attenuation.

Thus, an optical fiber is disclosed herein comprising a central core region and a clad layer. The central core region is disposed about a centerline and extending to a radius $R_1$, and the central core region has a local minimum relative refractive index percent $\Delta_{1,\,LM}$ located at a radius $R_{1,\,LM}$ on or near the centerline and a maximum relative refractive index percent $\Delta_{1,\,MAX}$ located at a radius $R_{1,\,MAX}$, wherein $R_{1,\,MAX} > R_{1,\,LM}$. The clad layer surrounds the central core region. The ratio $\Delta_{1,\,LM}/\Delta_{1,\,MAX}$ is greater than 0.65 and less than 1.0. The optical fiber exhibits an effective area not less than 115 µm$^2$ at a wavelength of 1550 nm and exhibits an increase in attenuation induced by one turn of said optical fiber about a 32 mm diameter mandrel less than about 0.5 dB at a wavelength of 1550 nm. The presence of a local minimum relative refractive index percent helps to provide a larger effective area, while a gradual increase in relative refractive index percent helps to hold down bending loss.

In one set of preferred embodiment, the clad layer abuts the central core region.

The optical fiber preferably exhibits lateral load bend loss at 1550 nm not greater than 1.5 dB/m.

In one set of preferred embodiments, the ratio $\Delta_{1,\,LM}/\Delta_{1,\,MAX}$ is between 0.6 and 0.9. In another set of preferred embodiments, the ratio $\Delta_{1,\,LM}/\Delta_{1,\,MAX}$ is between 0.7 and 0.85.

Preferably, the change in relative refractive index percent with respect to radius between $R_{1,\,LM}$ and $R_{1,\,MAX}$ is less than about 0.03% $-\mu m^{-1}$. In some preferred embodiments, the change in relative refractive index percent with respect to radius between $R_{1,\,LM}$ and $R_{1,\,MAX}$ is between about 0.01% $-\mu m^{-1}$ and about 0.03% $-\mu m^{-1}$.

The radial spacing between the maximum and the local minimum relative refractive index percent of the central core region, $R_{1,\,MAX}-R_{1,\,LM}$, is preferably greater than 3 $\mu m$, more preferably greater than 4 $\mu m$.

In one set of preferred embodiments, the ratio $R_{1,\,LM}/R_{1,\,MAX}$ is less than about 0.2. In another set of preferred embodiments, the ratio $R_{1,\,LM}/R_{1,\,MAX}$ is less than about 0.1.

Preferably, the ratio $R_{1,\,MAX}/R_{1}$ is greater than about 0.25. In one set of preferred embodiments, the ratio $R_{1,\,MAX}/R_{1}$ is greater than about 0.5.

Preferably, $R_1$ is between about 6 $\mu m$ and about 10 $\mu m$. In one set of preferred embodiments, $R_1$ is between about 7 $\mu m$ and about 9 $\mu m$.

Preferably, $\Delta_{1,\,MAX}$ is less than about 0.4%. In one set of preferred embodiments, $\Delta_{1,\,MAX}$ is between about 0.25% and about 0.35%.

Preferably, $\Delta_{1,\,LM}$ is between about 0.10% and about 0.3%.

Preferably, the relative refractive index percent rises monotonically from $\Delta_{1,\,LM}$ to $\Delta_{1,\,MAX}$.

Preferably, relative refractive index of the central core region is at all points from the centerline to $R_1$ greater than 0%.

In a preferred set of embodiments, the optical fiber further comprises an annular region disposed between the central core region and the clad layer, wherein the relative refractive index percent of the annular region is less than 0% and has a minimum relative refractive index percent $\Delta_{2,\,MIN}$, and wherein the annular region extends to a radius $R_2$.

Preferably, $\Delta_{2,\,MIN}$ is between about -0.05% and about -0.30%. In one set of preferred embodiments, $\Delta_{2,\,MIN}$ is between about -0.10% and about -0.20%.

Preferably, $R_2$ is between about 14 $\mu m$ and about 20 $\mu m$. Preferably, the ratio $R_2/R_1$ is less than about 3.

In one set of preferred embodiments, the optical fiber exhibits an effective area not less than 130 $\mu m^2$ at a wavelength of 1550 nm. In another set of preferred embodiments, the optical fiber exhibits an effective area not less than 150 $\mu m^2$ at a wavelength of 1550 nm. In yet another set of preferred embodiments, the optical fiber exhibits an effective area not less than 170 $\mu m^2$ at a wavelength of 1550 nm.

Preferably, the attenuation at a wavelength of 1550 nm is less than about 0.21 dB/km, more preferably less than about 0.20 dB/km, and even more preferably less than about 0.19 dB/km.

Preferably, the attenuation at a wavelength of 1610 nm is less than about 0.20 dB/km.

Preferably, the attenuation at a wavelength of 1380 nm is less than about 0.3 dB/km above the attenuation at a wavelength of 1310 nm. More preferably, the attenuation at a wavelength of 1380 nm is less than about 0.32 dB/km.

Even more preferably, the attenuation at a wavelength of 1380 nm is less than the attenuation at a wavelength of 1310 nm.

Preferably, the attenuation induced by one turn of said optical fiber about a 32 mm diameter mandrel is less than about 1.0 dB at a wavelength of 1610 nm, more preferably less than about 0.5 dB at a wavelength of 1610 nm, and even more preferably less than about 0.3 dB at a wavelength of 1610 nm.

Preferably, the optical fiber has a dispersion of less than 24 ps/nm-km at a wavelength of 1550 nm. In one set of preferred embodiments, the optical fiber has a dispersion of greater than 15 ps/nm-km and less than 24 ps/nm-km at a wavelength of 1550 nm.

A particular advantage offered by the refractive index profiles as disclosed herein is that the profiles are quite simple in design and thus are easier to manufacture than those designs having a more complex core structure. In one embodiment an adjustment of the relative refractive index percent on centerline allows the resulting optical waveguide fiber to simultaneously exhibit large effective area and remarkably good resistance to bend induced attenuation. In those systems where higher effective area is desirable, the addition of a single negative index annular region can be added.

All of the exemplary optical fibers disclosed herein were manufactured with a cladding diameter (i.e. outside diameter of the silica-based fiber) of 125 $\mu m$ and a coating, comprised of primary and secondary coating layers, that resulted in optical fibers having an outside diameter of 250 $\mu m$. The 125 $\mu m$ diameter cladding, as well as the 250 $\mu m$ optical fiber outside diameter, have become industry standard sizes. While one or more optical properties of an optical fiber may be changed by changing the cladding diameter and/or the coating thicknesses, the optical fibers disclosed herein provide large effective areas and low microbend losses without resorting to cladding diameters and/or coating thicknesses which deviate from industry standards, i.e. beyond industry accepted tolerances. Accordingly, the optical fibers disclosed herein preferably have a cladding outside diameter of about 125 $\mu m$. Furthermore, the optical fibers disclosed herein preferably have an outside coating diameter of 250 $\mu m$.

The refractive index profile designs as disclosed herein can be made using any of the preform making and drawing techniques known in the art, including modified vapor deposition, outside vapor deposition, or vertical deposition methods. Known consolidation and optional over-cladding steps can be used to make a preform in accord with the invention. Standard techniques can be used in the drawing step.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

We claim:

1. An optical fiber comprising:
   a central core region disposed about a centerline and extending to a radius $R_1$, the central core region having a local minimum relative refractive index percent $\Delta_{1,\,LM}$ located at a radius $R_{1,\,LM}$ on or near the centerline and a maximum relative refractive index percent $\Delta_{1,\,MAX}$ located at a radius $R_{1,\,MAX}$, wherein $R_{1,\,MAX}>R_{1,\,LM}$; and a clad layer surrounding the central core region;

wherein the ratio $\Delta_{1,\,LM}/\Delta_{1,\,MAX}$ is greater than 0.65 and less than 1.0; and wherein the optical fiber exhibits an effective area not less than 115 $\mu$m$^2$ at a wavelength of 1550 nm and an increase in attenuation induced by one turn of said optical fiber about a 32 mm diameter mandrel less than about 0.5 dB at a wavelength of 1550 nm.

2. The optical fiber of claim 1 wherein the attenuation at a wavelength of 1550 nm is less than about 0.21 dB/km.

3. The optical fiber of claim 1 wherein the optical fiber exhibits lateral load bend loss at 1550 nm not greater than 1.5 dB/m.

4. The optical fiber of claim 1 wherein the ratio $\Delta_{1,\,LM}/\Delta_{1,\,MAX}$ is between 0.6 and 0.9.

5. The optical fiber of claim 1 wherein the change in relative refractive index percent with respect to radius between $R_{1,\,LM}$ and $R_{1,\,MAX}$ is less than about 0.03%-$\mu$m$^{-1}$.

6. The optical fiber of claim 1 wherein the ratio $R_{1,\,LM}/R_{1,\,MAX}$ is less than about 0.2.

7. The optical fiber of claim 1 wherein the ratio $R_{1,\,MAX}/R_1$ is greater than about 0.25.

8. The optical fiber of claim 1 wherein $R_1$ is between about 6 $\mu$m and about 10 $\mu$m.

9. The optical fiber of claim 1 wherein $\Delta_{1,\,MAX}$ is less than about 0.4%.

10. The optical fiber of claim 1 wherein the relative refractive index percent rises monotonically from $\Delta_{1,\,LM}$ to $\Delta_{1,\,MAX}$.

11. The optical fiber of claim 1 wherein relative refractive index of the central core region is at all points greater than 0%.

12. The optical fiber of claim 1 further comprising an annular region disposed between the central core region and the clad layer, wherein relative refractive index percent of the annular region less than 0% and has a minimum relative refractive index percent $\Delta_{2,\,MIN}$, and wherein the annular region extends to a radius $R_2$.

13. The optical fiber of claim 12 wherein $\Delta_{2,\,MIN}$ is between about −0.05% and about −0.30%.

14. The optical fiber of claim 1 wherein the optical fiber exhibits an effective area not less than 130 $\mu$m$^2$ at a wavelength of 1550 nm.

15. The optical fiber of claim 1 wherein the optical fiber exhibits an effective area not less than 150 $\mu$m$^2$ at a wavelength of 1550 nm.

16. The optical fiber of claim 1 wherein the optical fiber exhibits an effective area not less than 170 $\mu$m$^2$ at a wavelength of 1550 nm.

17. The optical fiber of claim 1 wherein the attenuation at a wavelength of 1550 nm is less than about 0.19 dB/km.

18. The optical fiber of claim 1 wherein the attenuation at a wavelength of 1610 nm is less than about 0.20 dB/km.

19. The optical fiber of claim 1 wherein the attenuation at a wavelength of 1380 nm is less than about 0.3 dB/km above the attenuation at a wavelength of 1310 nm.

20. The optical fiber of claim 1 wherein the attenuation induced by one turn of said optical fiber about a 32 mm diameter mandrel is less than about 1.0 dB at a wavelength of 1610 nm.

* * * * *